United States Patent [19]

Oglesbee

[11] Patent Number: 5,235,368

[45] Date of Patent: Aug. 10, 1993

[54] PHOTOGRAPHIC STUDIO SYSTEMS

[76] Inventor: Brian J. Oglesbee, 126 N. Main St., Wellsville, N.Y. 14895

[21] Appl. No.: 619,731

[22] Filed: Nov. 29, 1990

[51] Int. Cl.$^5$ ............................................. G03B 15/00
[52] U.S. Cl. .................................................. 354/291
[58] Field of Search ............................ 354/290–292; 248/124, 127, 174, 152, 419, 444.1, 448, 449, 460, 463

[56] References Cited

U.S. PATENT DOCUMENTS

| 557,990 | 4/1896 | Green et al. | 354/291 |
| 596,312 | 12/1897 | Badgley | 354/291 |
| 882,838 | 3/1908 | Novess | 354/290 |
| 3,967,301 | 6/1976 | Corning | 354/292 |
| 4,340,293 | 7/1982 | Russotti | 354/291 |

FOREIGN PATENT DOCUMENTS

| 3776 | 12/1906 | Switzerland | 354/291 |
| 13508 | of 1910 | United Kingdom | 354/290 |

OTHER PUBLICATIONS

Photo District News, Leedal Murphy Shooting Table, Oct. 1989.
Photo District News, Delta Studio Shooting Table, p. 99, Oct. 1990.
Foto Tools Catalogue, The Systems Table and The Product Table.
Tristar Catalogue, Photographic Light Stands and Accessories.
The Denny Mfg. Co., Inc. Catalogue—Roller Packages and The Deluxe Studio.
Matthews Studio Equipment—Grip Equipment for Still Photography, pp. 1–5, 13–15—1988.
Fatif Milano General Catalogue, pp. 20–21.
Lowel-Light Mfg., Inc. catalogue—pp. 4, 8. 1982.
Go Click Catalogue. Kaiser Product Table and Studio Pro Background Stand.
Studio Background Systems—Motorized Systems.
Lowel Catalogue, p. 41. Aug. 1989.
Sinar Bron Catalogue, pp. 70, 74. 1989.
UB Lighting-Vinyl Background Sweeps.
Matrix Catalogue M-2—The Matric Reprostands, pp. 2–5 1984.
Berry Photographic Products—Berry Model #—Strong Arm.
Berry Photographic—Berry Model #FUM-75. #DCC & BC-1 Clamp.
Bogen 2908, 2906, 2911, 2913.
Lowel-Light Mfg., Inc.—pp. 1–4, Tota-clamp—1983.
Tristar—Aluminum Boomarms and Monopads 103SF, 106BC, 116BC.
Bogen Photo Corp.—Bogen Camera Stands, pp. 1–6.

Primary Examiner—D. Rutledge
Attorney, Agent, or Firm—Cumpston & Shaw

[57] ABSTRACT

A photographic studio apparatus for retaining a background sheet in a desired curvilinear configuration in relation to light sources for illumination control devices is disclosed. The apparatus includes a support stand having an elevated mount to which an upper retainer is coupled. The upper retainer secures to a first end of the sheet and the coupling allows the upper retainer to be disposed in a vertical plane independent of the vertical plane of the elevated mount. The apparatus includes glide mounts, pivot blocks and pivot clamps, for providing an articulated mount and adjustable arm, and structural support members.

10 Claims, 7 Drawing Sheets

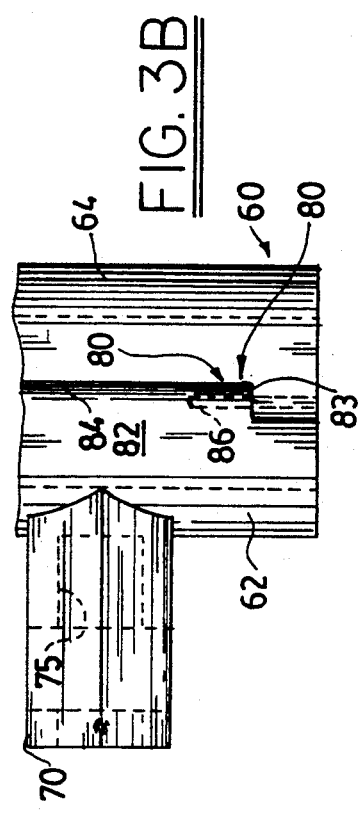
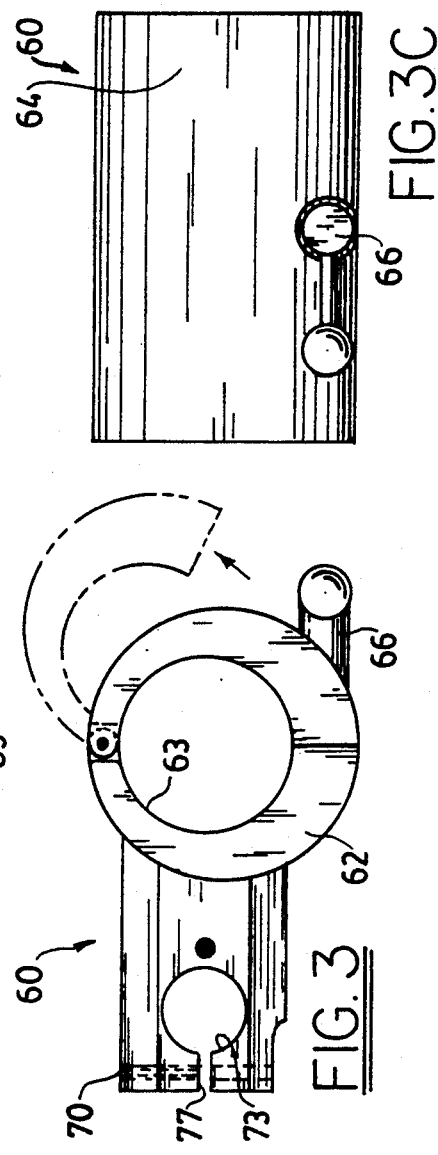
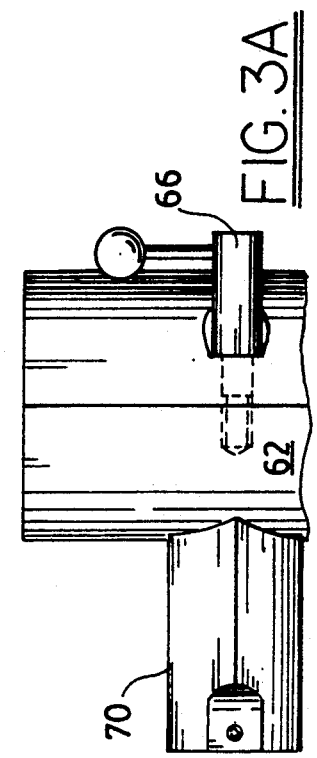
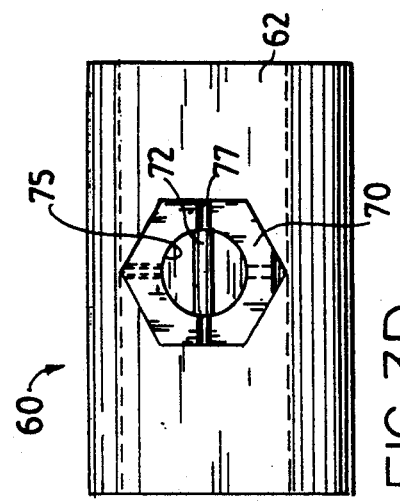

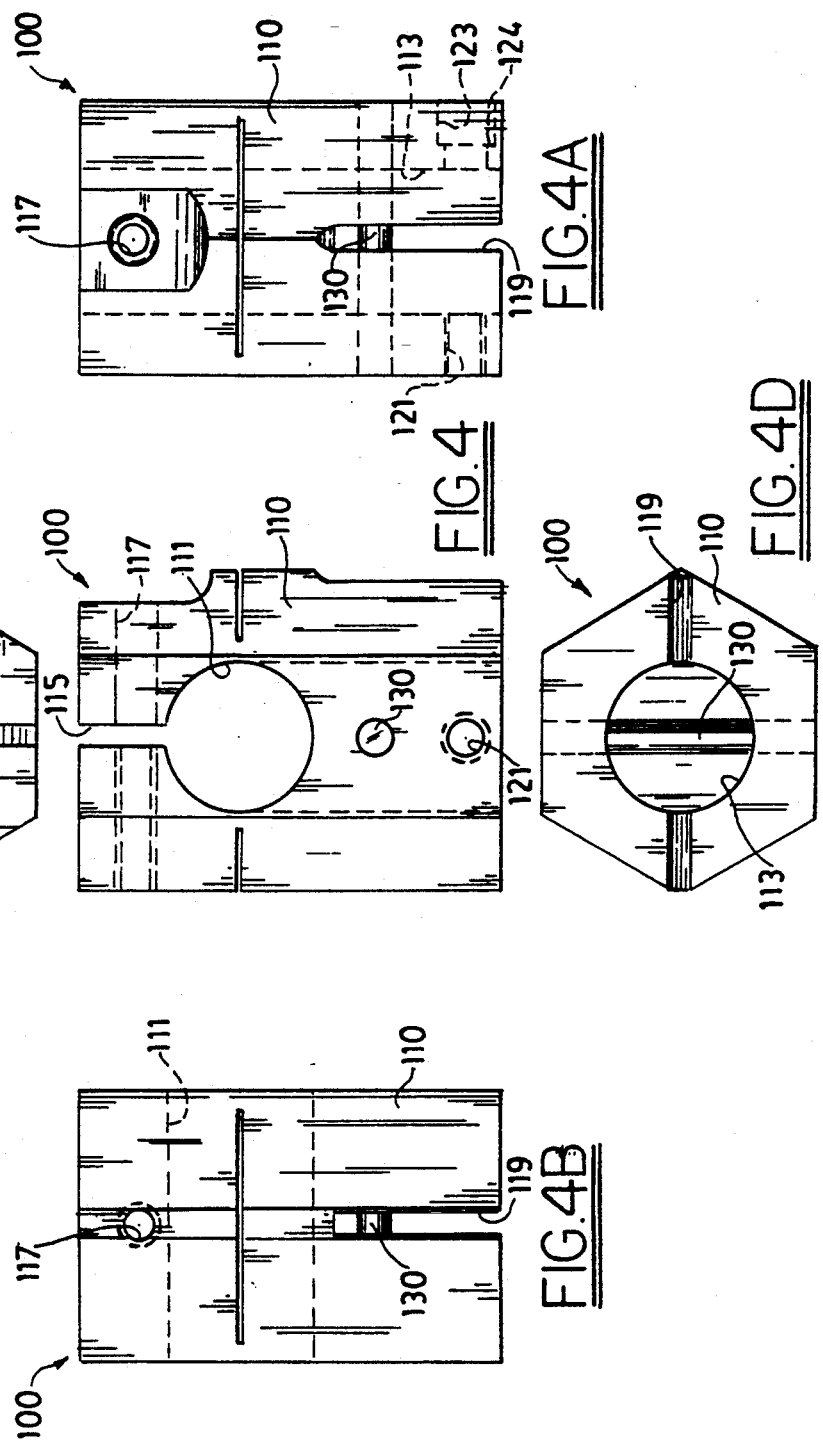

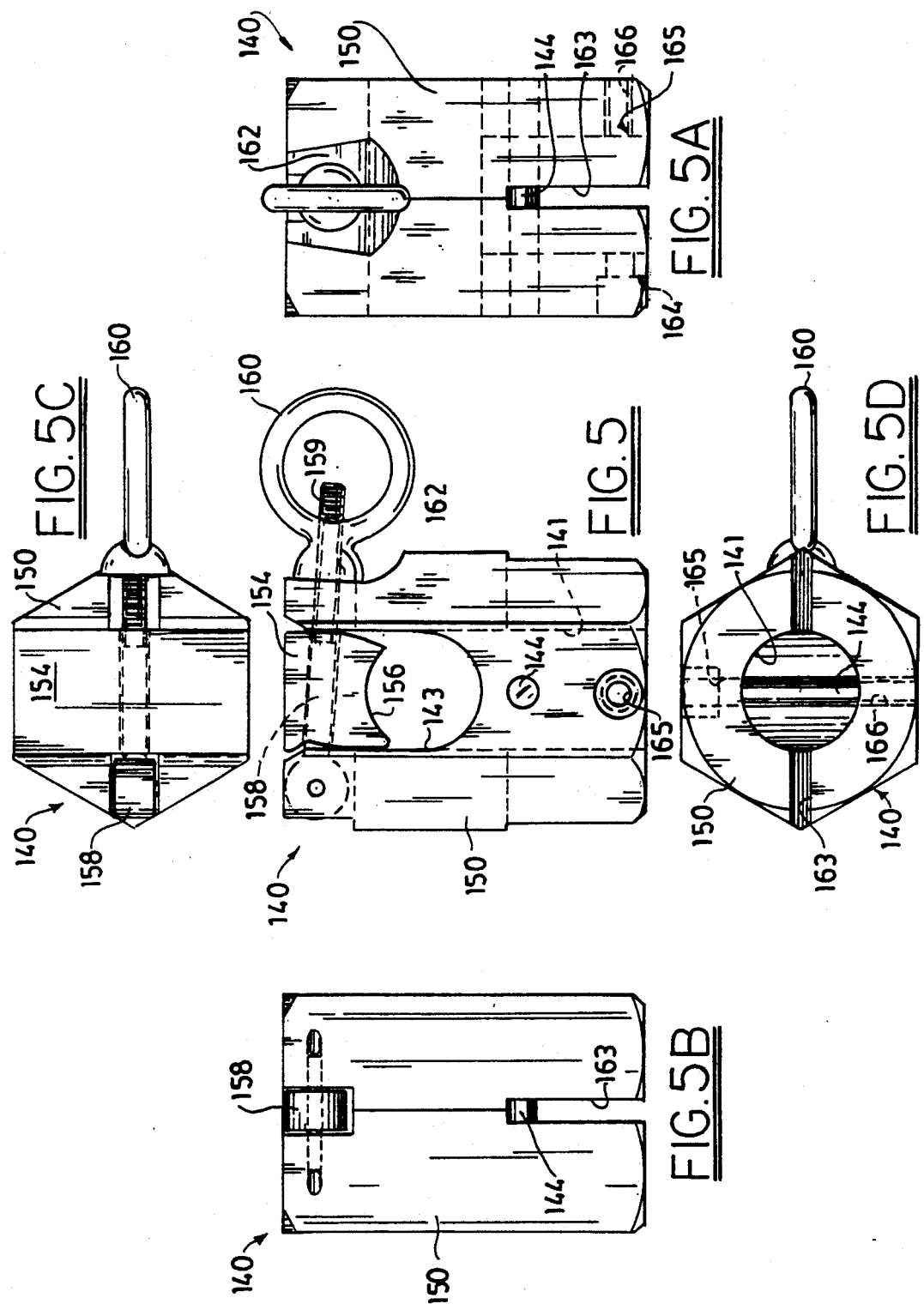

PHOTOGRAPHIC STUDIO SYSTEMS

FIELD OF THE INVENTION

The present invention relates to a photographic studio apparatus for providing controlled support and lighting of a given subject, and more particularly, to a support stand having articulated sections for permitting the retention of translucent, transparent or opaque sheets in a variety of curvilinear or angled configurations, wherein lighting sources and illumination controll devices may be selectively and reproducibly retained relative to the subject and the background sheet.

DESCRIPTION OF RELATED ART

In studio photography, the lighting of the subject is often the determining factor in the quality of the photograph. If the necessary lighting cannot be achieved or reproduced, the portrayal of the subject is ineffective.

In order to provide the desired lighting effects in studio photography, background and illumination control devices are employed. The backgrounds are cloth, paper, translucent, transparent or opaque sheet materials hung from a horizontal support. Alternatively, the sheet may be fixed in a frame wherein the frame is suspended. The illumination control devices include flood lamps, diffusers, umbrellas and reflectors. These devices must be supported in various positions relative to the subject and the sheet, particularly for obtaining various artistic effects.

The desired configuration of the background, lights and illumination control devices varies between different views of a given subject or between different subjects. That is, different shots require different configurations.

The cooperation of lights with the background and the illumination control devices is accomplished by independent stands which may be selectively disposed about the background and the subject so as to obtain the desired lighting effect. However, as all the system components are individually mounted, it is often extremely complicated to obtain the desired effect. In addition, reproducibility of the components relative positions is difficult.

Therefore, a need exists for a photographic studio apparatus for selectively retaining a background in a variety of angled or curvilinear configurations. A further need exists for the cooperation of the subject, the light sources, the illumination control devices and the background, such that the desired lighting may be reproducibly achieved. The need also exists for a stand which allows the curvilinear retention of backgrounds of different resiliencies, wherein the background may be capable of supporting the subject.

SUMMARY OF THE INVENTION

A photographic studio system for retaining a flexible sheet of material having a desired optical transmissivity and reflectivity (a background) in an angled or curvilinear configuration, wherein a plurality of light sources and illumination control devices may be reproducibly disposed relative to the subject, is disclosed. The system includes a support stand which cooperates with a plurality of couplers to provide the desired background configuration and lighting effects. The support stand includes an elevated mount to which a first end of the sheet is coupled. The coupling between the sheet and the mount allows for translatable and pivotal support of the sheet relative to the mount. The coupling allows the sheet to be disposed in a vertical plane independent of the vertical plane of the elevated mount. The stand permits the curvilinear orientation of the sheet without requiring the use of additional support structures. Preferably, the stand includes an articulated mount for selectively disposing the second end of the background relative to the elevated mount.

The light sources and illumination control devices are retained relative to the support stand by glide mounts, structural support members, pivot blocks and pivot clamps, which may provide adjustable arms to which the devices are attached. The adjustable arms provide mounts for the light sources and illumination control devices.

BRIEF DESCRIPTION OF THE DRAWINGS

FIGS. 3-3D are a series of views showing the glide mount;

FIGS. 4-4D are a series of views showing the pivot block;

FIGS. 5-5D are a series of views showing the pivot clamp;

DETAILED DESCRIPTION OF THE PREFERRED EMBODIMENT

Figure 1:
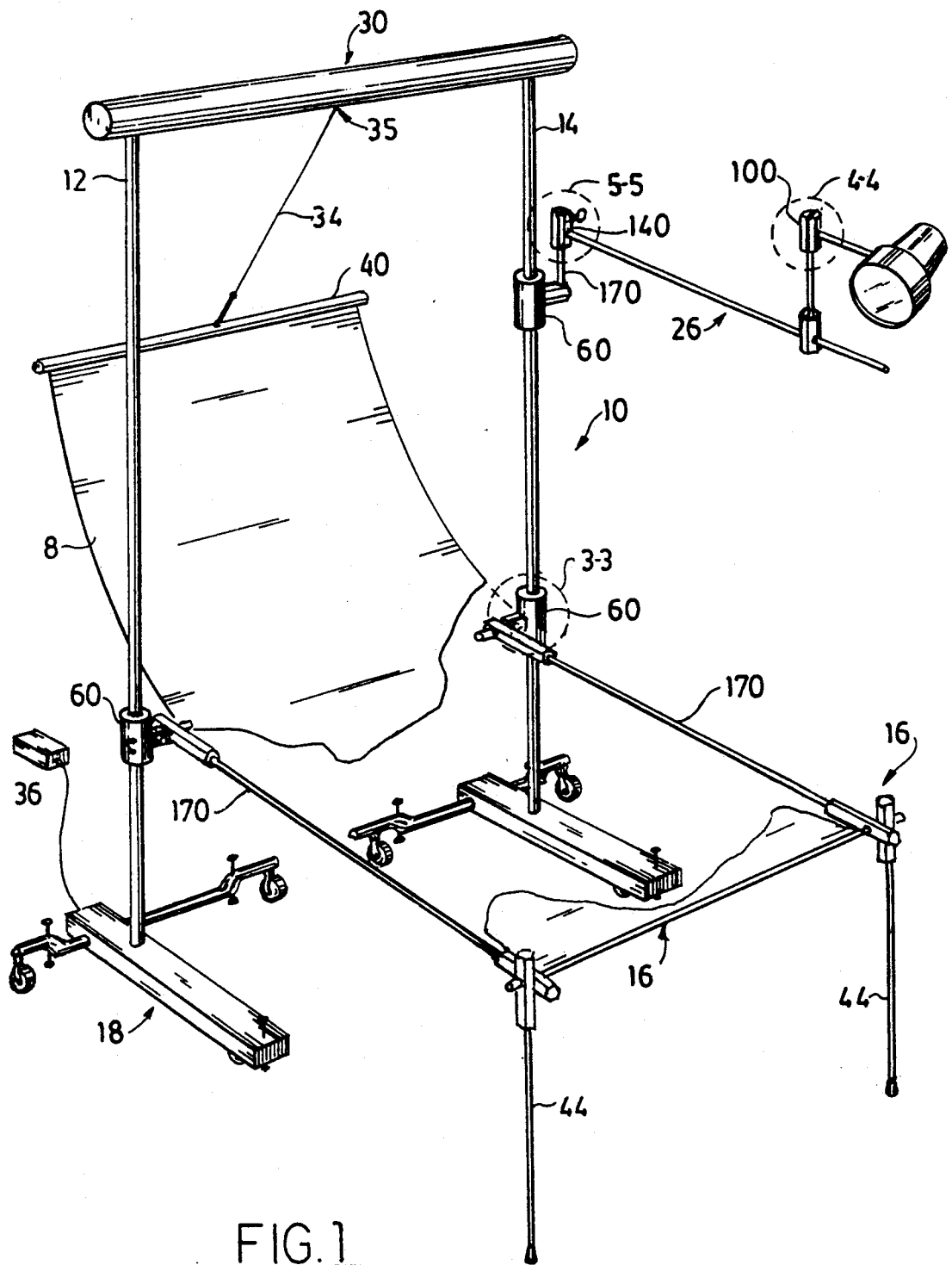
FIG. 1 is a perspective view of a studio system showing an illuminated background sheet in a curvilinear configuration.

Referring to FIG. 1, a preferred embodiment of the present invention includes a support stand 10 which cooperates with a glide mount 60, a pivot block 100, a pivot clamp 140 and structural support members 170 to provide adjustable lighting configurations for a given subject (not shown). The studio system allows for the retention of a sheet of material 8, such as a background having a selected transmissivity and reflectivity, in various curvilinear configurations, in conjunction with the use of illumination control devices such as diffusers, umbrellas, and reflectors to provide different lighting effects. The light sources and illumination control devices may be reproducibly affixed relative to the sheet 8 and the subject. The support stand 10 may provide a support to hold the subject; retain a background sheet 8 in a curvilinear or angled configuration; retain a light source; and retain illumination control devices. The illumination control devices may include reflectors, umbrellas, diffusers, dots, fingers and flags.

A preferred embodiment of the present invention includes the support stand 10 having an elevated mount 35 and an articulated mount 16 selectively connected to the sheet 8 for retaining the sheet in various curvilinear configurations.

The articulated mount 16 may be secured at selected angles and heights relative to the elevated mount 35 and the support stand 10, by means of a combination of glide mounts 60, pivot blocks 100, pivot clamps 140 and structural support members 170. The articulated mount 16 may cantilever from the support stand 10, rest upon the ground, or depend from the support stand. The articulated mount 16 may be used to selectively retain the second end of the sheet, and depending upon the rigidity of the sheet, provide support for the subject.

As shown in FIG. 1, the articulated mount 16 is disposed relative to the support stand 10 so as to provide a planar surface upon which the subject may be placed. The glide mount 60, pivot block 100, pivot clamp 140 and structural support members 170 may also provide an adjustable arm 26 for the retention of lights, illumination control devices or photographic equipment relative to the sheet 8 and the subject.

Figure 2:
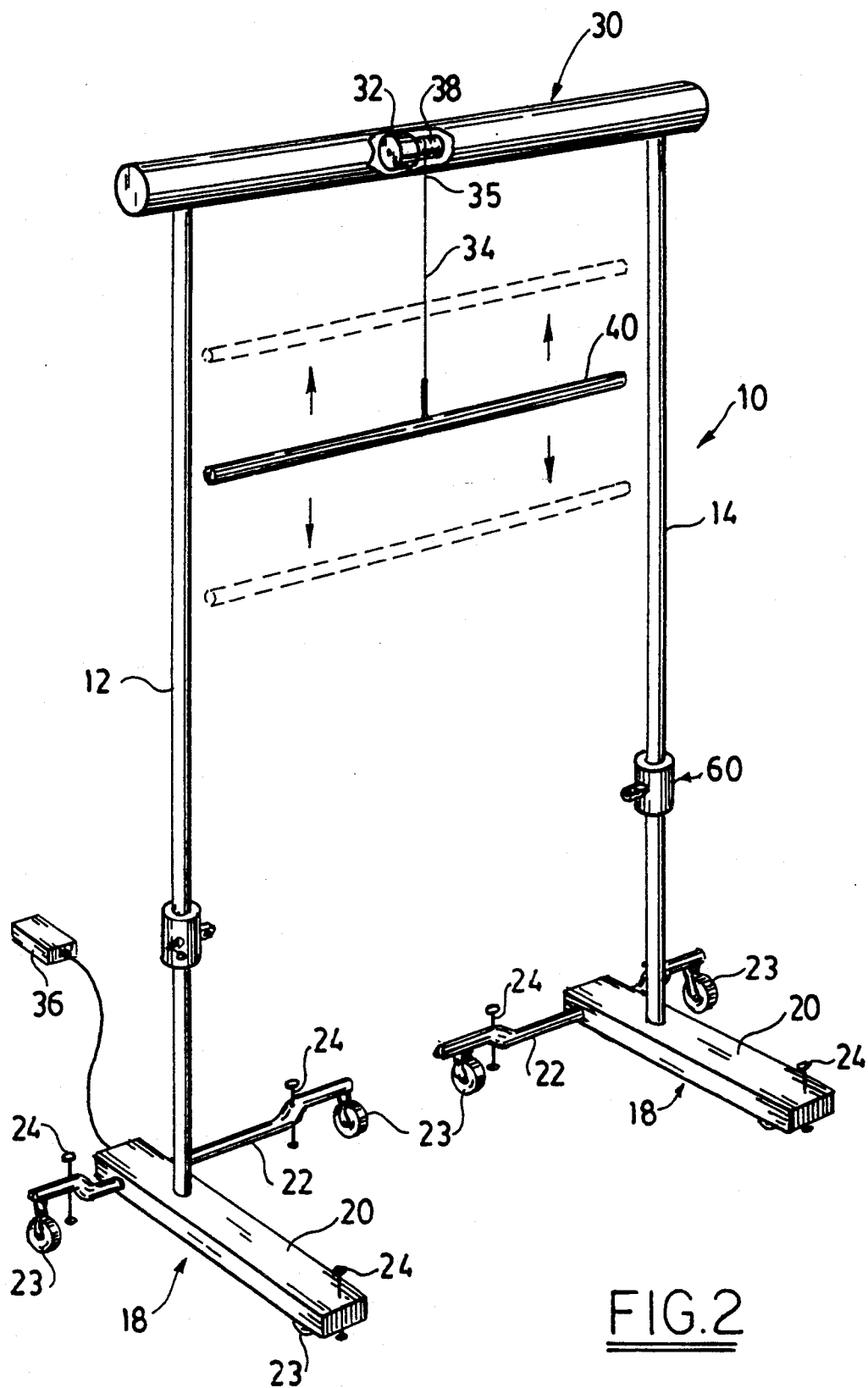
FIG. 2 is a perspective view of the support stand showing the translational displacement of the upper retainer.

Referring to FIG. 2, the support stand 10 includes a pair of parallely spaced vertical supports 12, 14. The supports 12, 14 are of a tubular construction and may be formed from a variety of materials such as aluminum, steel or alloys. Preferably, the supports are formed of heavy wall Drawn Over Mandrel (DOM) Cold Finished Steel 1018, and have an outside diameter of two inches. The bottom of each support is retained in a foot 18. Each foot 18 includes base 20 and a perpendicular stabilizer 22. The stabilizer 22 is slidably received within the base 20, so that the foot 18 may assume a substantially T-shape or an L-shape. Wheels 23 are rotatably affixed to the base 20 and stabilizer 22, so as to permit movement of the stand 10 relative to the floor. The foot 18 includes risers 24 proximate to each wheel 23. The risers 24 can selectively separate the wheel 23 from the floor so as to prevent movement of the stand 10. The foot 18 provides a broad contact area with the floor so as to provide a stable base for the support stand 10.

As shown in FIGS. 1 and 2, a transverse header 30 extends between the supports 12, 14 at a given elevation. The header 30 may engage the top of the supports 12, 14, or alternatively may be secured to the supports distal to the feet by clamps (not shown). The header 30 includes a reeling mechanism having a motor 32 connected to a capstan or drum 38 upon which a cable 34 is wound, so as to be selectively retractable or extractable. The motor 32 may be remotely actuated by control 36. The cable 34 exits the header 30 in a given vertical plane in the center of the header. That is, the header 30 provides the elevated mount 35 which is disposed in substantially the same vertical plane as the header. The header 30 may include two laterally spaced retractable cables (not shown) which exit the header in the given vertical plane. Alternatively, the header 30 may not include the motor 32, wherein a length of cable is affixed to the mount 35.

An upper retainer 40 is attached to the free end of the cable 34. The upper retainer 40 selectively attaches to one end of the sheet 8. The upper retainer 40 is sized so that it may pass between the vertical supports 12, 14, beneath the header 30. As the cable 34 attaches to the upper retainer 40, the distance between the upper retainer 40 and the header 30 may be selectively adjusted by changing the length of the cable 34. Preferably, the motor 32 is used to selectively wind the cable 34 about the drum 38 so as to vary the distance between the mount 35 and the upper retainer 40. Referring to FIG. 1, the upper retainer 40 may be separated from the elevated mount 35 by any of a variety of distances. The cable 34 provides a coupling for translatably and pivotally supporting the upper retainer 40 relative to the mount 35. The upper retainer 40 can occupy a vertical plane independent of the vertical plane of the mount 35.

As shown in FIG. 1, the lower end of the sheet 8 may be retained by the articulated mount 16 in a curvilinear configuration having a substantially planar portion. The sheet 8 may also be partially set on the ground. The sheet 8 may also be selectively disposed in a vertical configuration.

Preferably, the sheet 8 exhibits a flexural rigidity such that upon the fixation of one end of the sheet, the other end is biased towards the plane of the first end. Therefore, upon securing the second end of the sheet 8 in the articulated mount 16 in a vertical plane independent of the plane of the header 30, the bias of the sheet 8 urges the first end of the sheet to be coplanar with the second end. As the first end of the sheet 8 is secured to the upper retainer 40, the upper retainer is urged to a vertical plane independent of the header 30. The cable 34 connecting the retainer 40 to the header 30 acts as a coupling which permits the upper retainer to be displaced into a vertical plane independent of the header. Depending upon the resiliency of the sheet, the upper retainer 40 may be substantially displaced from the vertical plane of the mount 35 such that the vertical distance between the mount and the upper retainer is reduced. Alternatively, the upper retainer 40 may be in substantially the same vertical plane as the mount 35 such that the vertical distance between the mount and the upper retainer is substantially equal to the length of the cable 34.

The support stand 10 thereby provides for the retention of the sheet 8 in a variety of curvilinear configurations as dictated by the length of the cable 34, and the resiliency of the sheet.

The articulated mount 16 and adjustable arm 26 may include the glide mount 60, the pivot block 100, the pivot clamp and the structural support members 170, or any combination thereof, as dictated by the desired lighting effects.

Referring to FIG. 1, the glide mount 60 releasably affixes to the vertical supports 12, 14 and provides a mounting for the structural support members 170 relative to the subject, the sheet 8 and the illumination control devices. As shown in FIGS. 3–3D, the glide mount 60 includes a retaining portion 62 and a securing portion 64. The retaining portion 62 and the securing portion 64 are hingeably attached by a hinge 80 so that the diameter of a vertical support 12, 14 may pass between the portions. The retaining portion 62 and the securing portion 64 may be closed to form a clamping aperture 63. The clamping aperture 63 is off center from the periphery of the glide mount 60.

The hinge 80 is formed by a projecting tab 82 on the retaining portion 62 and a recess 83 in the securing portion 64. Preferably, the recess 83 extends the majority of the length of the securing portion 64. The tab 82 has a rounded end 84 to permit rotation within the recess 83. The tab 82 is pivotally retained in the recess 83 by a pin 86. The inner contacting surface of the clamping aperture 63 includes an ultra high molecular weight polyurethane coating such as Flouroglass* pressure sensitive tape. The coating reduces the friction between the glide mount 60 and the vertical supports 12, 14. A glide mount 60 is selectively clamped to a vertical support 12, 14 by a threaded fastener 66 as well known in the art. The fastener 66 is selectively turned so as to vary the effective diameter of the clamping aperture 63 to releasably secure the glide mount 60 relative to the vertical supports 12, 14. Upon loosening of the fastener 66, the a non-sticking interface of the coating between the glide mount 60 and the vertical support 12, 14 allows the glide mount to smoothly slide along the support A mounting block 70 is rigidly affixed to the retaining portion 62. The mounting block 70 includes a through aperture 73 substantially parallel to the clamping aperture 63, and an orthogonal recess 75. The through aperture 73 and the orthogonal recess 75 are cylindrically shaped and sized to slidably receive the structural support members 170. An alignment pin 72 radially extends into the distal end of the orthogonal recess 75. Preferably, the alignment pin 72 extends across the diameter of the orthogonal recess 75. The mounting block 70 includes a variable gap 77 which longitudinally intersects the through aperture 73 and radially intersects the orthogonal recess 75, such that the selective reduction of the variable gap 77 decreases the effective circumference of the through aperture 73 and the orthogonal recess 75. The variable gap 77 is selectively decreased by a fastener (not shown). The fastener extends across the variable gap 77 and is used to draw the opposing sides of the gap together. As the circumferences are decreased, the structural members 170 are secured within the orthogonal recess 75 or the through aperture 73.

Referring to FIG. 1, the pivot block 100 provides for the interconnection of the structural members 170 so that the light sources or illumination control devices may be selectively and reproducibly disposed relative to the subject and the background sheet 8. As shown in FIGS. 4-4D, the pivot block 100 includes a central housing 110 having a through aperture 111 and an orthogonal recess 113 sized to slidably receive a structural support member 170. The housing 110 includes a variable gap 115 which intersects the through aperture 111 along the longitudinal axis and extends to the edge of the housing 110. The variable gap 115 is intersected by a transverse channel 117. The transverse channel 117 allows a bolt or other rigid member to pass through the housing 110 so as to intersect the variable gap 115 without penetrating the periphery of the through aperture 111. A threaded fastener (not shown) may extend through the transverse channel 117 and draw the opposing sides of the variable gap 115 together to decrease the size of the variable gap and therefore, decrease the effective periphery of the through aperture 111. As the variable gap 115 is reduced, the circumference of the through aperture 111 is also reduced, so as to secure a structural member 170 therein.

The housing 110 includes a variable gap. 119 which intersects the orthogonal recess 113 along the longitudinal axis. Opposing sides of the variable gap 119 include co-linear apertures 121, 123. Aperture 123 includes a shoulder 124. Aperture 121 is threaded to cooperatively engage a threaded fastener 122. The fastener 122 may be threaded into aperture 121 so as to penetrate the periphery of the orthogonal recess. Alternatively, a fastener may be passed through aperture 123 and cooperatively engage aperture 121, so as to selectively close the variable gap 119. The pivot block 100 includes an alignment pin 130 which extends across the diameter of orthogonal recess 113.

Referring to FIG. 1, the pivot clamp 140 provides for the selective orientation of the light sources or illumination control devices relative to the subject and the background sheet 8. As shown in FIGS. 5-5D, the pivot clamp 140 includes a housing 150 having a longitudinal aperture 141 and an orthogonal U-shaped recess 143.

An alignment pin 144 extends into the longitudinal aperture 141. Preferably, the alignment pin extends across the diameter of aperture 141. The pivot clamp 140 includes a latch 154 pivotally attached to the housing 150 so that the latch may be selectively disposed within the orthogonal recess 143. The latch 154 includes an arcuate engaging surface 156, such that when the latch occludes the recess 143, a substantially circular periphery is formed by the arcuate portion of the recess and the engaging surface. Preferably, the latch 154 is pivotally attached to housing 150 upon a pivot arm 158 having a threaded terminal portion 159. A lock member 160 threads onto the threaded portion 159 of the pivot arm 158. The pivot arm 158 has a length greater than the diameter of the housing 150 so that a threaded portion 159 extends beyond the housing. The side of the housing 150 opposing the pivotal connection includes a camming surface 162 for engaging the lock member 160 as it threads on the end of the pivot arm 158. As the effective length of the pivot arm 158 is reduced, the camming surface 162 causes the pivot arm to be further rotated towards the recess 143 so that the engaging surface 156 of the latch 154 is further disposed within the recess thereby reducing the circumference. The reduced circumference allows for the retention of a structural support member 170 within the pivot clamp 140.

The longitudinal recess 141 is intersected by a variable gap 163 which extends to the edge of the housing 150. The variable gap 163 is intersected by a transverse channel 165. The channel 165 includes a shoulder 164 and a threaded portion 166. A threaded fastener may cooperatively engage the threaded portion 166 so as to penetrate the periphery of the longitudinal recess 141, and cooperate with a structural support member 170 so as to retain the member within the recess 141. Alternatively, a fastener may engage the shoulder 164 and pass through the recess 141 to cooperatively engage the threaded portion 166, and thereby narrow the gap 163 so as to retain a structural support therein.

Figure 6A:
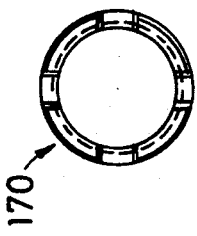
FIGS. 6-6D are a series of views showing the structural support members.
Figure 6:
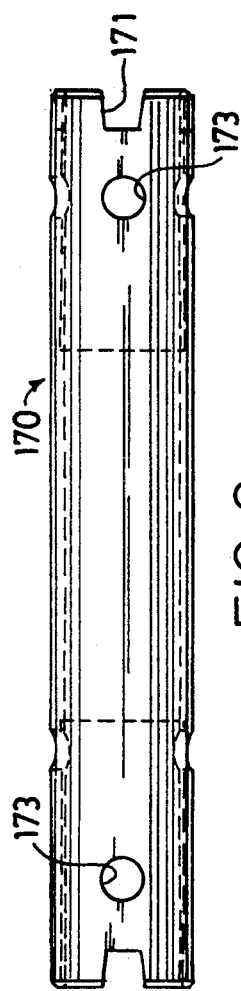
Figure 6C:
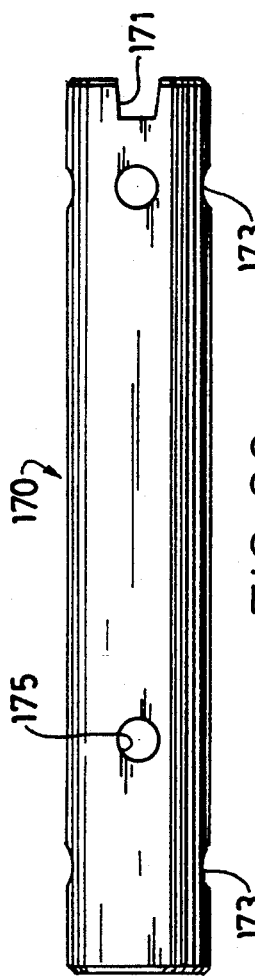
Figure 6D:
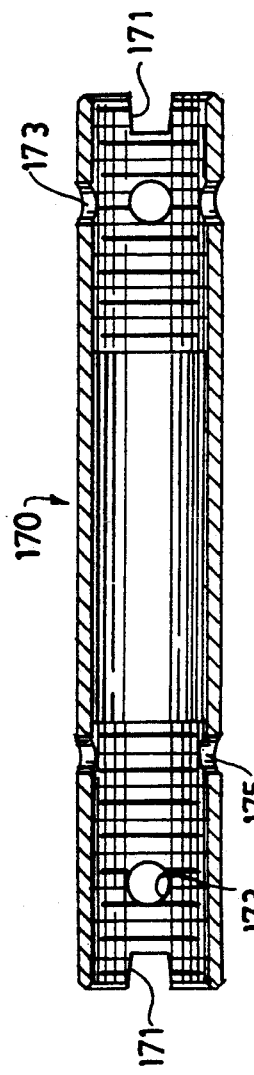
Figure 6B:
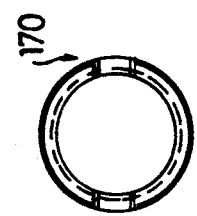

Referring to FIGS. 6-6D, the structural members 170 are a substantially cylindrical or tubular construction having notches 171 at the terminal ends for cooperatively engaging the alignment pin within the glide mount 160, the pivot block 100 and the pivot clamps 140, so as to form the articulated mount 16, and adjustable arm 26. The structural members 170 are constructed of heavy wall Drawn Over Mandrel (DOM) Cold Finished Steel 1018 steel or polished aluminum such as 6061 T-6. The glide mount 60, pivot block 100, and pivot clamp 140 may be formed of the same or similar materials. The structural members 170 also include an aperture 173 proximal to the terminal ends so that a retainer may be engaged in the aperture so as to prevent radial and axial movement of the structural member 170 relative to the pivot block 100, pivot clamp 140, or glide mount 60. The structural members 170 include an inner aperture 175. Preferably, the outer apertures 173 near one end of the member 170 include two co-linear aperture pairs wherein the pairs are perpendicular to each other. The other end of the member 170 includes a single set of co-linear outer apertures 173. The second end of the member 170 includes an inner pair of co-linear inner apertures 175 which are perpendicular to the outer apertures 173 of the second end.

Figure 7:
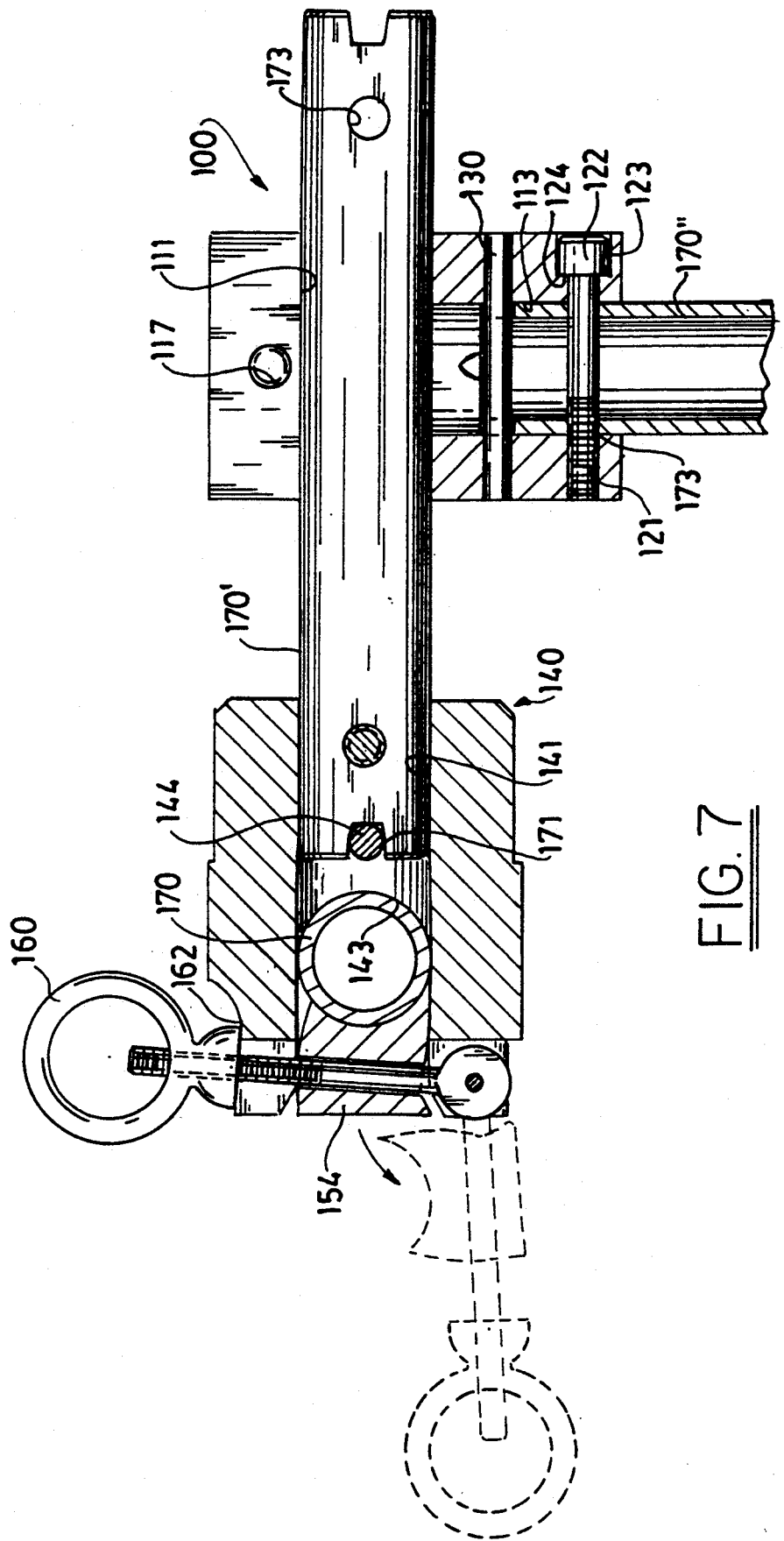
FIG. 7 is a partial cross-sectional view showing the cooperative engagement of a pivot block, a pivot clamp, and a structural support member to form an articulated or adjustable member.

Referring to FIG. 7, the construction of the articulated mount 16, or adjustable arm 26 may be achieved through the cooperation of the glide mount 60, pivot clamp 140, pivot block 100 and structural members 170. A structural member 170 is retained within the arcuate recess 143 of the pivot clamp 140. The latch 154 is drawn into the recess 143 by action of the lock 160 upon the camming surface 162, so as to releasably retain structural support member 170 within the recess. A separate portion of the structural support member may be releasably engaged in the mounting block 70 of the glide mount 60.

A structural member 170' is perpendicularly retained within the pivot clamp 140 in the longitudinal recess 141. The terminal notches 171 of the structural member 170' cooperatively engage the alignment pin 144. A fastener is shown in channel 165, so as to retain the structural member 170 relative to the pivot clamp. The structural member 170' passes through the through aperture 111 of pivot block 100. As the transverse channel 117 does not include a fastener, the pivot block 100 may be selectively disposed along the structural member 170'. A structural member 170" is retained in the orthogonal recess 113. The terminal notches 171 cooperatively engage the alignment pin 130. The fastener 122 is retained within the co-linear apertures 121 and 123, such that the fastener passes through the outer apertures 173 in the structural member 170". The sheet 8, light sources, and illumination control devices can then be releasably positioned and secured relative to the subject, and the stand 10 by means of the articulated mount 16, and adjustable arm 26.

Although the present invention has been described in terms of particular embodiments, it is not limited to these embodiments. Alternative embodiments and modifications, which would still be encompassed by the invention, may be made by those skilled in the art, particularly in light of the foregoing teachings. Alternative embodiments, modifications, or equivalents may be included within the spirit and scope of the invention, as defined by the claims.

What is claimed:

1. A photographic studio apparatus for selectively retaining a sheet of material having a given light transmissivity and reflectivity in selectable curvilinear configuration, comprising:
   (a) a support stand having an elevated mount, the mount having means for movably securing the upper end of the sheet at selectable heights; and
   (b) articulated mount means for connecting a remote portion of the sheet relative to the support stand at selectable angles and heights for supporting the sheet in a curvilinear configuration.

2. The photographic apparatus of claim 1, wherein the articulated mount means includes:
   (a) a glide mount releasably fastened to the support stand; and
   (b) a structural support member releasably affixed to the glide mount and extending remote from the support stand for cooperatively supporting the remote portion of the sheet.

3. The photographic studio apparatus of claim 1, further comprising:
   an adjustable arm connected to the support stand for selectively retaining an illumination control device relative to the sheet.

4. The photographic studio apparatus of claim 3 wherein the adjustable arm includes: (a) a glide mount releasably fastened to the support stand; and
   (b) a structural support member releasably affixed to the glide mount and extending remote from the support stand for cooperatively engaging an illumination control device.

5. A photographic studio apparatus for selectively retaining a sheet having a given transmissivity and reflectivity in a desired curvilinear configuration, comprising:
   (a) a rigid upright support having an elevated mount disposed in a first vertical plane;
   (b) an upper retainer for securing a first portion of the sheet;
   (c) coupling means connecting the elevated mount to the upper retainer for supporting the upper retainer in a selected vertical plane spaced horizontally from the first vertical plane; and
   (d) means for selectively altering the distance between the elevated mount and the upper retainer to achieve the desired curvilinear configuration.

6. The apparatus of claim 5 further comprising means for supporting a second portion of the sheet remote from the first portion.

7. The apparatus of claim 5, wherein the coupling means comprises a cable.

8. An apparatus for selectively retaining a flexible sheet of material having a given transmissivity and reflectivity in a selective curvilinear configuration, comprising:
   (a) a first substantially vertical support;
   (b) a second substantially vertical support extending parallel to the first vertical support;
   (c) a transverse header extending from the first vertical support to the second vertical support and lying in a first vertical plane;
   (d) an upper sheet retainer sized to pass between the first and second vertical supports for securing a first end of the flexible sheet of material;
   (e) a coupling connecting the transverse header to the upper retainer such that the upper retainer may be disposed in a selected vertical plane independent of the vertical plane defined by the header; and
   (f) means for selectively adjusting the distance between the upper retainer and the header.

9. An apparatus for selectively retaining a flexible sheet having a given transmissivity and first end and a second end in a curvilinear configuration, comprising:
   (a) a pair of upwardly extending spaced apart supports;
   (b) a header extending between the supports so as to connect the supports;
   (c) an upper retainer sized to pass between the supports beneath the header for selectively securing to the sheet;
   (d) a coupling connecting the header to upper retainer for permitting the upper retainer to pass between the supports and retain the sheet in a curvilinear configuration.

10. The apparatus of claim 9, further comprising means for selectively changing the distance between the header and the upper retainer.

* * * * *